(12) United States Patent
Hall

(10) Patent No.: US 7,012,245 B2
(45) Date of Patent: Mar. 14, 2006

(54) CALCULATION OF SENSOR ARRAY INDUCED PHASE ANGLE

(75) Inventor: David B. Hall, La Crescenta, CA (US)

(73) Assignee: Northrop Grumman Corporation, Woodland Hills, CA (US)

(*) Notice: Subject to any disclaimer, the term of this patent is extended or adjusted under 35 U.S.C. 154(b) by 258 days.

(21) Appl. No.: 10/615,730

(22) Filed: Jul. 9, 2003

(65) Prior Publication Data

US 2005/0008278 A1 Jan. 13, 2005

(51) Int. Cl.
*G01J 5/08* (2006.01)
*G01B 9/02* (2006.01)

(52) U.S. Cl. ............... 250/227.19; 250/227.27; 356/478; 329/346

(58) Field of Classification Search ......... 250/200, 250/227.11, 227.14, 227.19, 227.27; 356/450, 356/477, 478; 385/12–14; 329/304, 311, 329/313, 345, 346
See application file for complete search history.

(56) References Cited

U.S. PATENT DOCUMENTS

| | | | |
|---|---|---|---|
| 5,903,350 A | | 5/1999 | Bush et al. |
| 6,122,057 A | * | 9/2000 | Hall ........................ 356/450 |
| 6,134,281 A | | 10/2000 | Green et al. |
| 6,154,308 A | * | 11/2000 | Hall ........................ 359/325 |

* cited by examiner

*Primary Examiner*—Kevin Pyo
(74) *Attorney, Agent, or Firm*—Patti & Brill, LLC

(57) ABSTRACT

A sensor array employs a parameter to induce a time-varying phase angle $\phi$ on an optical signal that comprises a phase generated carrier. The phase angle $\phi$ is calculated through employment of only four samples, where all the four samples are based on the optical signal.

32 Claims, 7 Drawing Sheets

CALCULATION OF SENSOR ARRAY INDUCED PHASE ANGLE

STATEMENT OF GOVERNMENT RIGHTS

The Government of the United States of America has rights in this invention pursuant to Contract No. N00024-02C-6305 awarded by the U.S. Department of the Navy.

TECHNICAL FIELD

The invention relates generally to signal processing and more particularly to demodulation of signals from fiber optic sensor arrays.

BACKGROUND

Fiber optic sensor arrays of a time division multiplexed ("TDM") system are often used to measure a change in a parameter, for example, acoustic vibration, fluid pressure variations, acceleration, and magnetic field intensity. The fiber optic sensor array employs a phase generated carrier with a period T to measure the change in the parameter at a given sampling rate. The fiber optic sensor array converts a phase angle associated with the parameter to an amplitude variation on an output pulse of light.

The phase angle is measured through various demodulation techniques of the output pulse. Typical demodulation techniques employ a quadrature component Q and an in-phase component I of the output pulse. The quadrature component Q corresponds to a sine of the phase angle, and the in-phase component I corresponds to a cosine of the phase angle. An arctangent of the ratio Q/I is equal to the phase angle. The magnitude of the change in the parameter can then be calculated from the change in the phase angle.

Calculation of the quadrature component Q and the in-phase component I requires multiple samples of the output pulse at specific intervals of the phase generated carrier. The phase generated carrier comprises a period that is significantly longer than a period of the output pulse. The longer period of the phase generated carrier requires the samples to span several output pulses to obtain each required interval of the phase generated carrier. It is desirable to increase the rate of calculation of the phase angle to promote an increase in throughput. For a constant sampling rate, the number of required samples must be reduced to increase the rate of calculation of the phase angle.

Thus, a need exists for reduced numbers of required samples for demodulation techniques of fiber optic sensor arrays that employ phase generated carriers.

SUMMARY

The invention in one embodiment encompasses a method. A sensor array employs a parameter to induce a time-varying phase angle $\phi$ on an optical signal that comprises a phase generated carrier. The phase angle $\phi$ is calculated through employment of only four samples, where all the four samples are based on the optical signal.

Another embodiment of the invention encompasses an apparatus. A sensor array employs a parameter to induce a time-varying phase angle $\phi$ on an optical signal that comprises a phase generated carrier. The apparatus comprises a processor component that employs only four samples to calculate the phase angle $\phi$, where all the four samples are based on the optical signal.

A further embodiment of the invention encompasses an article. A sensor array employs a parameter to induce a time-varying phase angle $\phi$ on an optical signal that comprises a phase generated carrier. The article includes one or more computer-readable signal-bearing media. The article includes means in the one or more media for calculating the phase angle $\phi$ through employment of only four samples, where all the four samples are based on the optical signal.

DESCRIPTION OF THE DRAWINGS

Features of exemplary implementations of the invention will become apparent from the description, the claims, and the accompanying drawings in which:

DETAILED DESCRIPTION

Figure 1:
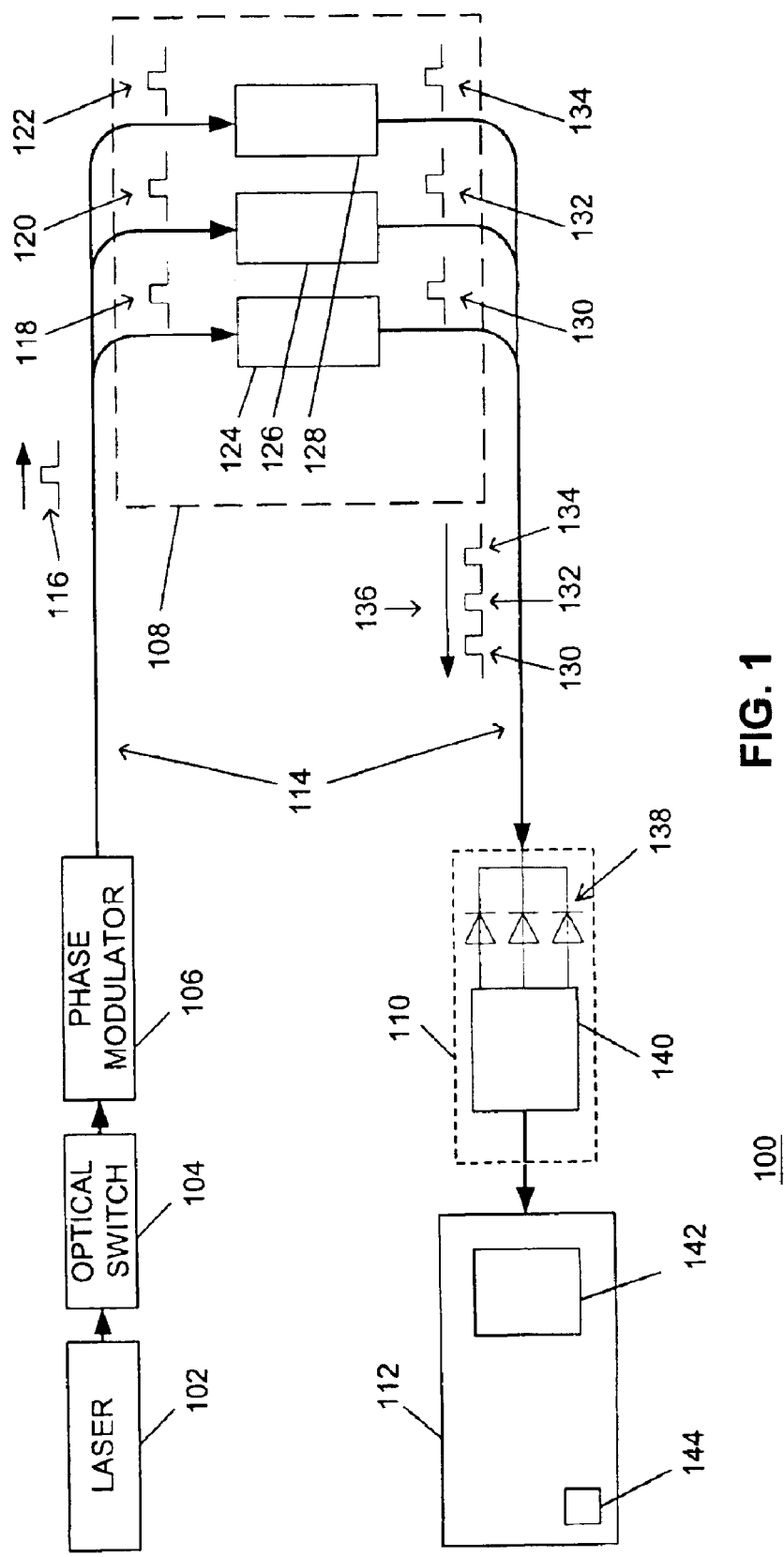
FIG. 1 is a representation of one exemplary implementation of an apparatus that comprises one or more lasers, one or more optical switches, one or more phase modulators, one or more sensor arrays, one or more optical receivers, and one or more processor components for calculating a phase angle $\phi$ through employment of only four samples from an optical signal.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

Referring to FIG. 1, the apparatus 100 in one example comprises one or more lasers 102, one or more optical switches 104, one or more phase modulators 106, one or more sensor arrays 108, one or more optical receivers 110, and one or more processor components 112. In one example, the apparatus 100 demodulates an optical signal to measure a change in a parameter, as described herein. The laser 102 in one example comprises a continuous wave laser. The laser 102 generates and sends an optical signal through the optical switch 104 and the phase modulator 106 to the sensor array 108.

The optical switch 104 in one example comprises a time division multiplexed ("TDM") switch. The optical switch 104 gates the optical signal such that the optical signal comprises a stream of optical pulses. The phase modulator 106 impresses a phase generated carrier ("PGC") 114 on the stream of optical pulses. For example, the laser 102, the optical switch 104, and the phase modulator 106 cooperate to create one or more optical pulses 116 that comprise the phase generated carrier 114, as will be understood by those skilled in the art. The optical pulse 116 comprises a period $T_{pulse}$. The period $T_{pulse}$ in one example is approximately between 50 nanoseconds and 500 nanoseconds. The phase generated carrier 114 in one example comprises a period $T_{pgc}$ and a modulation depth of M. The period $T_{pgc}$ comprises a relationship with a frequency $f_{pgc}=1/T_{pgc}$, as will be understood by those skilled in the art. The frequency $f_{pgc}$ in one example is approximately between 20 KHz and 100 KHz. The phase generated carrier 114 is associated with a demodulation phase offset β. The phase generated carrier 114 creates a time-varying phase angle equal to $$M \cdot \sin\left(\frac{2\pi \cdot t}{T_{pgc}} + \beta\right).$$

The sensor array 108 in one example comprises one or more sensors 124, 126, and 128, for example, mismatched path interferometers. The sensor array 108 splits the optical pulse 116 into one or more optical pulses 118, 120, and 122, for example, one pulse per sensor. The optical pulses 116, 118, 120, and 122 in one example are substantially the same. The sensors 124, 126, and 128 of the sensor array 108 receive the optical pulses 118, 120, and 122, respectively. The sensors 124, 126, and 128 of the sensor array 108 in one example employ one or more parameters and the optical pulses 118, 120, and 122 to create one or more respective interference pulses 130, 132, and 134. Exemplary parameters comprise acoustic vibration, fluid pressure variations, acceleration, and magnetic field intensity. For example, the sensor 124 splits the optical pulse 118 into a first portion and a second portion. The sensor 124 employs the parameter to induce a time-varying phase angle φ on the first portion of the optical pulse 118, relative to the second portion of the optical pulse 118. The sensor 124 recombines the first portion of the optical pulse 118 with the second portion of the optical pulse 124 to create the interference pulse 130. A time-varying amplitude variation of the interference pulse 130 represents the time-varying phase angle φ between the first portion and the second portion of the optical pulse 118.

The optical pulses 116 comprise an intermediary spacing such that the interference pulses 130, 132, and 134 comprise a relatively small spacing, for example, a high duty cycle, as described herein. The interference pulses 130, 132, and 134 comprise a period substantially equal to the period $T_{pulse}$ of the optical pulse 116. The sensor array 108 sends the interference pulses 130, 132, and 134 to the optical receiver 110 in a pulse train 136, for example, in a serial fashion. For example, the optical pulse train 136 comprises the interference pulses 130, 132, and 134.

The optical receiver 110 in one example comprises one or more photodiodes 138. In a further example, the optical receiver 110 comprises a transimpedance amplifier 140. The optical receiver 110 in one example comprises a polarization diversity receiver system as disclosed in U.S. Pat. No. 5,852,507 to Hall, issued May 10, 1996, and assigned to Litton Systems Inc. The optical receiver 110 receives the optical pulse train 136. The optical receiver 110 then creates one or more respective analog electrical signals that represent the interference pulses 130, 132, and 134 from the optical pulse train 136. For example, the optical receiver 110 converts a magnitude of power of the optical pulse train 136 to a voltage signal.

The processor component 112 in one example comprises a digital signal processor. In a further example, the processor component 112 comprises an analog-to-digital converter component 142. The processor component 112 in one example comprises an instance of a computer-readable signal-bearing media 144, as described herein. The analog-to-digital converter component 142 converts the analog electrical signal from the optical receiver 110 into a digital signal. The processor component 112 in one example serves to sense a change in the parameters by employing the time-varying amplitude variation of the interference pulses 130, 132, and 134 to calculate the time-varying phase angle φ.

An illustrative description of exemplary operation of the apparatus 100 is presented, for explanatory purposes. The laser 102, the optical switch 104, and the phase modulator 106 cooperate to create the one or more optical pulses 116. The sensor array 108 splits the optical pulse 116 into the optical pulses 118, 120, and 122. The sensors 124, 126, and 128 employ the parameters and the optical pulses 118, 120, and 122 to create the interference pulses 130, 132, and 134. The sensor array 108 sends the interference pulses 130, 132, and 134 as the optical pulse train 136 to the optical receiver 110.

The optical receiver 110 creates an analog electrical signal that represent the one or more interference pulses 130, 132, and 134. For example, the analog electrical signal is defined as s(t, M, β, φ):

$$s(t, M, \beta, \varphi) = A + B \cdot \cos\left(M \cdot \sin\left(\frac{2\pi \cdot t}{T_{pgc}} + \beta\right) + \varphi\right),$$

where A is an average signal level, B is an interference term signal level, M is the modulation depth, $T_{pgc}$ is the period of the phase generated carrier, β is the demodulation phase offset, and φ is the phase angle. The phase angle of s(t, M, β, φ) comprises a first portion due to the phase generated carrier, $$M \cdot \sin\left(\frac{2\pi \cdot t}{T_{pgc}} + \beta\right),$$

and a second portion due to the parameter, φ, as will be understood by those skilled in the art.

The analog-to-digital converter component 142 in one example converts the analog electrical signal from the optical receiver 110 into a digital signal that represents the interference pulse 130. The processor component 112 obtains only four samples of the interference pulse 130 from the digital signal. For example, the four samples comprise samples $S_0$, $S_1$, $S_2$, and $S_3$. The processor component 112 obtains the four samples at time intervals Δt over a period $T_s$. The period $T_s$ in one example is substantially equal to the period $T_{pgc}$ of the phase generated carrier 114. The time interval Δt is equal to $T_{pgc}/4$. For example, the four samples comprise samples at $t_0$, $t_0+\Delta t$, $t_0+2\Delta t$, $t_0+3\Delta t$.

The processor component 112 employs one or more of the four samples to calculate an in-phase term I. For example, the processor component 112 calculates the in-phase term I:

$I=(S_0+S_2)-(S_1+S_3).$

The processor component 112 calculates a peak value $I_p$ of the in-phase term I. For example, the processor component 112 calculates the peak value $I_p$:

$$I_p(M, \beta) = 2 \cdot B \cdot \left(\cos(M \cdot \sin\beta) - \cos\left(M \cdot \sin\left(\frac{\pi}{2} + \beta\right)\right)\right).$$

The processor component 112 employs one or more of the four samples to calculate a quadrature term Q. In one example, the processor component 112 calculates the quadrature term Q:

$$Q=-(S_0-S_2).$$

In another example, the processor component 112 calculates the quadrature term Q:

$$Q=-2\cdot(S_0-S_2).$$

The processor component 112 calculates a peak value $Q_p$ of the quadrature term Q. In one example where $Q=-(S_0-S_2)$, the processor component 112 calculates the peak value $Q_p$:

$$Q_p(M,\beta)=2\cdot B\cdot\sin(M\cdot\sin\beta)$$

In another example where $Q=-2\cdot(S_0-S_2)$, the processor component 112 calculates the peak value $Q_p$:

$$Q_p(M,\beta)=4\cdot B\cdot\sin(M\cdot\sin\beta).$$

The phase angle φ is given by:

$$\frac{Q}{I} = R(M, \beta) \cdot \tan\varphi,$$

where a ratio R(M, β) is equal to $Q_p/I_p$, as will be appreciated by those skilled in the art.

The ratio R(M, β) in one example describes a ratio of principal axes of an elliptical Lissajous pattern for an operating point. The operating point in one example comprises a value of the modulation depth M and a value of the demodulation phase offset β. The processor component 112 in one example calculates the values for the modulation depth M and the demodulation phase offset β such that the ratio R(M, β) is substantially equal to one, to promote an increase in accuracy of a calculation of the phase angle φ. In one example where $Q=-(S_0-S_2)$, the processor component 112 employs a value of 2.75 radians for the modulation depth M to calculate the phase offset β of the operating point, as described herein. In another example where $Q=-2\cdot(S_0-S_2)$, the processor component 112 employs a value of 2.49 radians for the modulation depth M to calculate the phase offset β of the operating point, as described herein.

The processor component 112 in one example employs the in-phase term I and the quadrature term Q to calculate the phase angle φ. For example, near an operating point, the ratio R(M, β) is substantially equal to unity, and the processor component 112 calculates the phase angle φ:

$$\varphi=\text{arctangent}(Q/I).$$

The processor component 112 in one example employs the change in the phase angle φ between multiple instances of the interference pulses 130, 132, and 134 to determine the change in the parameters employed by the sensors 124, 126, and 128.

Figure 2:
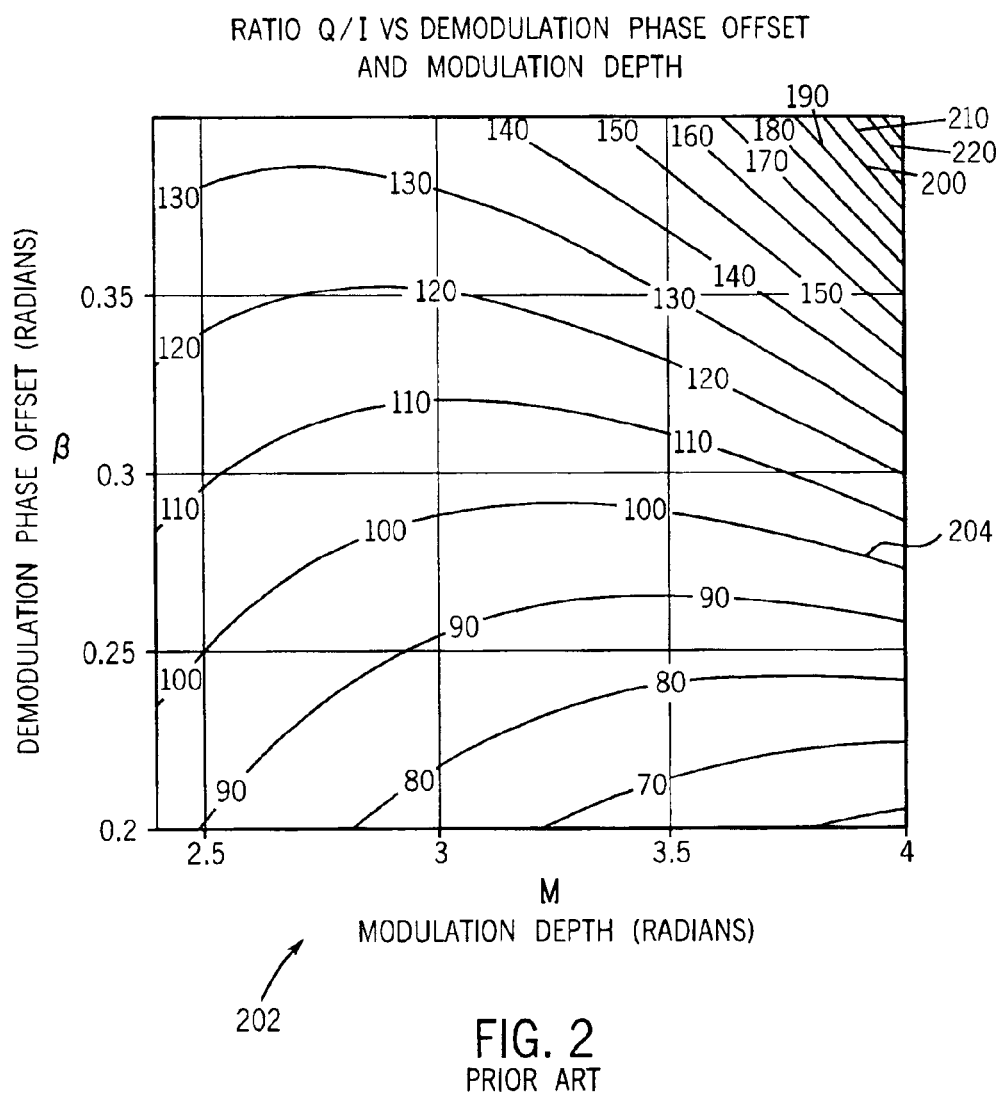
FIG. 2 is a representation of a contour plot of a ratio R(M, $\beta$) for a previous design.
Figure 3:
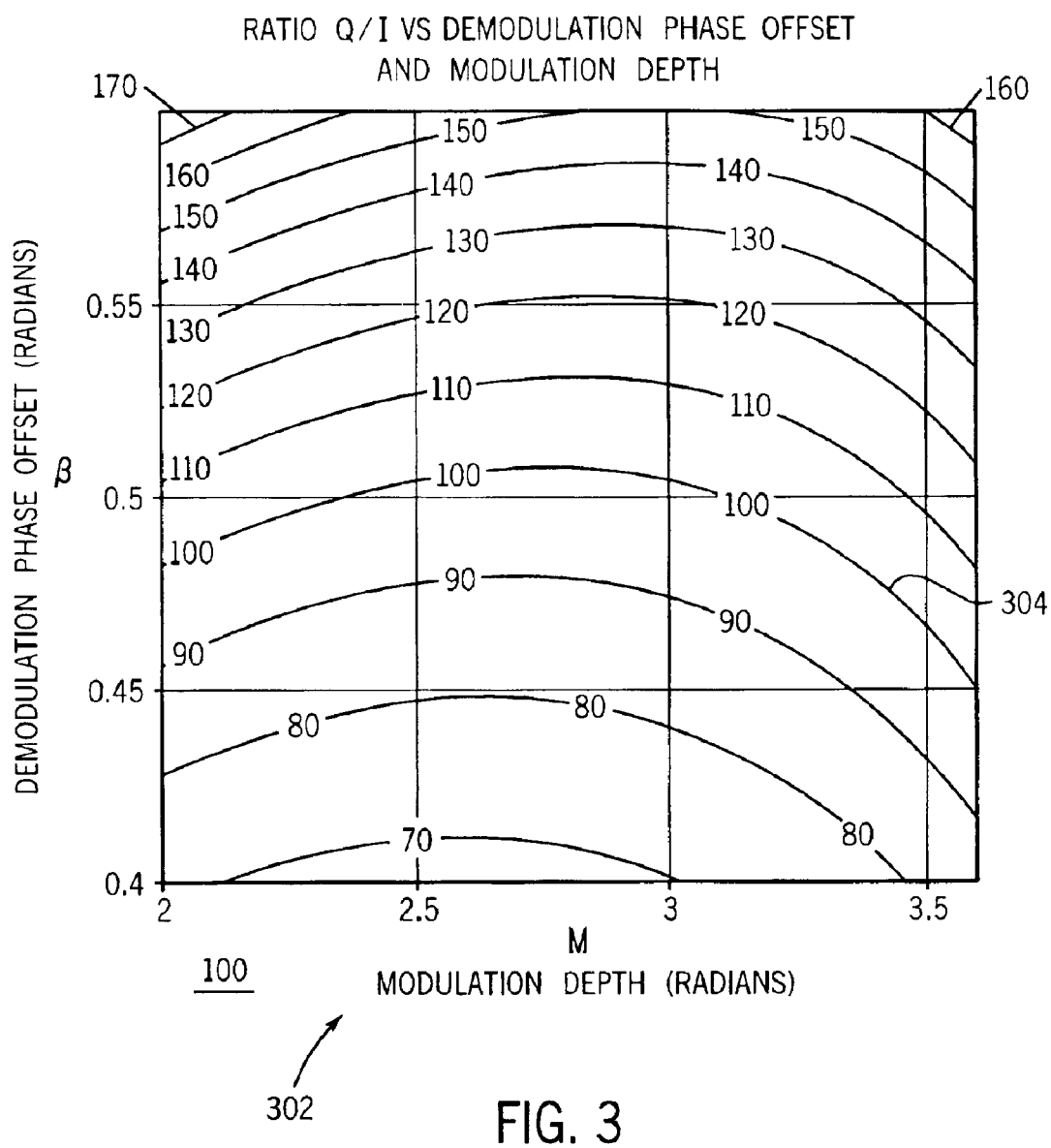
FIG. 3 is a representation of one exemplary contour plot of a ratio R(M, $\beta$) for the implementation of FIG. 1.
Figure 4:
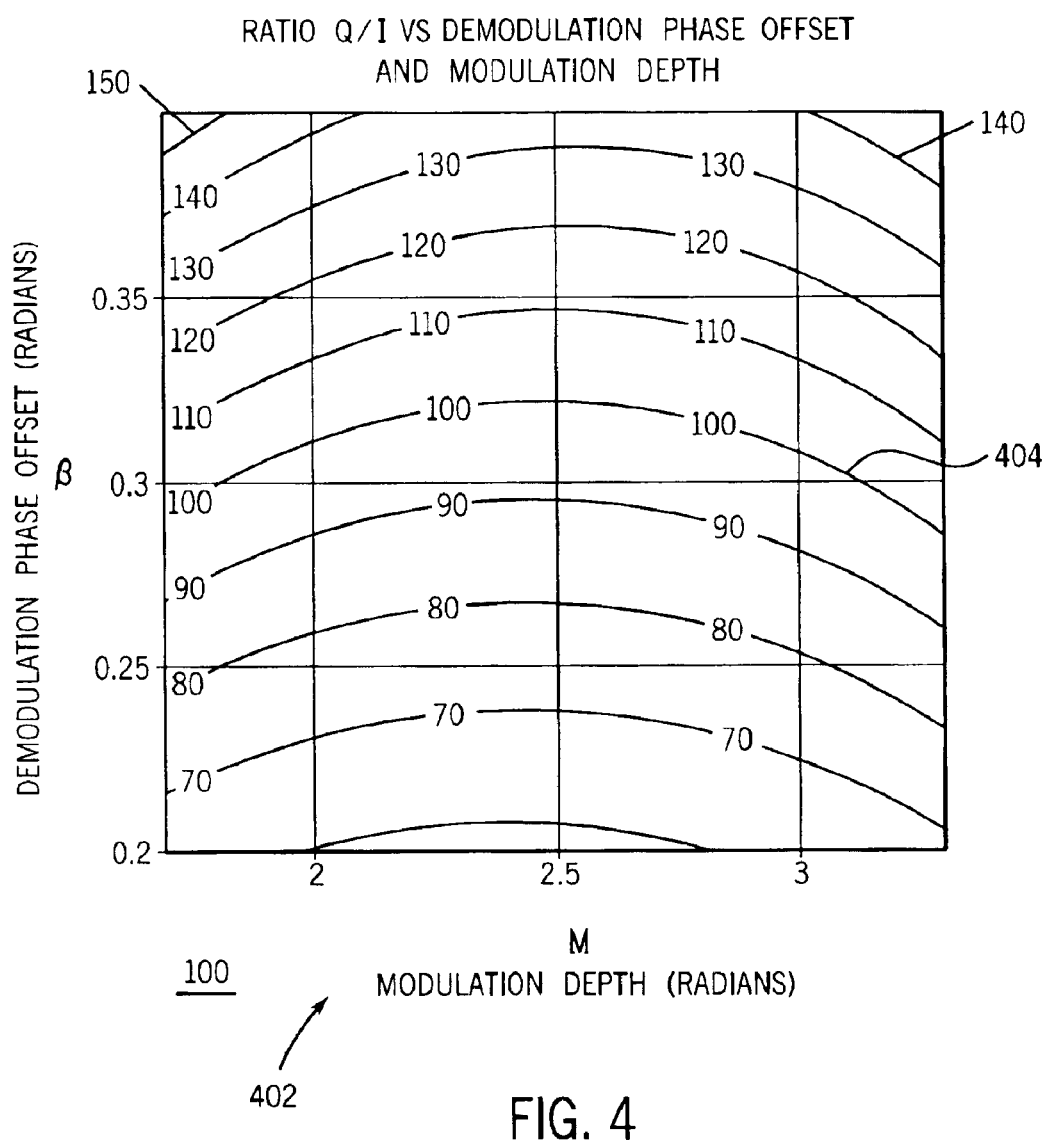
FIG. 4 is a representation of another exemplary contour plot of the ratio R(M, $\beta$) for the implementation of FIG. 1.

Turning to FIGS. 2–4, contour plots 202, 302, and 402 comprise a representation of the ratio R(M, β) for a previous design, a first implementation of the apparatus of FIG. 1, and a second implementation of the apparatus of FIG. 1, respectively. The contour lines represent the ratio Q/I versus the modulation depth M and the demodulation phase offset β. Contour line 204, 304, and 404 represent values for the modulation depth M and the demodulation phase offset β where the value of R(M, β) equals unity (100%). A modulation depth M is calculated to promote a decrease in sensitivity to the modulation depth M, as will be appreciated by those skilled in the art. For example, where a slope of the contour line 204, 304, and/or 404 approaches zero, the ratio R(M, β) is least sensitive to the modulation depth M.

An accuracy of the calculation of the phase angle φ comprises a relationship with a maximum amplitude of the quadrature term Q and the in-phase term I. For example, at an operating point, the ratio R(M, β) is equal to unity, and the peak value $Q_p$ and the peak value $I_p$ are substantially equal.

Referring to FIG. 2, the contour plot 202 comprises a representation of the ratio R(M, β) for a previous design that employs six samples. The contour line 204 comprises a value of "100%" for the ratio R(M, β). The contour line 204 approaches zero at a modulation depth M of approximately 3.25 radians. A corresponding value of the demodulation phase offset β is 0.2914 radians. A common operating point for the previous design comprises a modulation depth M of 3.14 radians and a demodulation phase offset β of 0.2908. Four of the six samples are used to calculate Q, and four of the six samples are used to calculate I. The maximum amplitude for the quadrature term Q and the in-phase term I is equal to 4×B, where B is the interference term signal level. At the operating point, the amplitude of the quadrature term Q and the in-phase term is equal to:

$$Q_p(\pi, 0.2908)=I_p(\pi, 0.2908)=3.24\times B.$$

Referring to FIG. 3, the contour plot 302 comprises an exemplary representation of the ratio R(M, β) for an exemplary implementation of the apparatus of FIG. 1 where $Q=-(S_0-S_2)$. The contour line 304 comprises a value of "100%" for the ratio R(M, β). The processor component 112 in one example calculates the modulation depth M approximately equal to 2.75 radians such that the slope of the contour line 304 approaches zero. The processor component 112 in a further example calculates a corresponding value of the demodulation phase offset β approximately equal to 0.5073 radians. At the operating point, $I_p$ is substantially equal to $Q_p$. For example, $$2\cdot B\cdot\left(\cos(M\cdot\sin\beta) - \cos\left(M\cdot\sin\left(\frac{\pi}{2}+\beta\right)\right)\right) = 2\cdot B\cdot\sin(M\cdot\sin\beta).$$

Therefore, the maximum amplitude is equal to 2×B, as will be understood by those skilled in the art. At the operating point, $Q_p(2.75, 0.5073)=I_p(2.75, 0.5073)=1.97\times B$.

Referring to FIG. 4, the contour plot 402 comprises an exemplary representation of the ratio R(M, β) for another exemplary implementation of the apparatus of FIG. 1 where $Q=-2\cdot(S_0-S_2)$. The contour line 404 comprises a value of "100%" for the ratio R(M, β). The processor component 112 in one example calculates the modulation depth M approximately equal to 2.49 radians such that the slope of the contour line 404 approaches zero. The processor component 112 in a further example calculates a corresponding value of the demodulation phase offset β approximately equal to 0.3218 radians. At the operating point, $I_p$ is substantially equal to $Q_p$. For example, $$2\cdot B\cdot\left(\cos(M\cdot\sin\beta) - \cos\left(M\cdot\sin\left(\frac{\pi}{2}+\beta\right)\right)\right) = 4\cdot B\cdot\sin(M\cdot\sin\beta).$$

Therefore, the maximum amplitude is equal to 4×B, as will be understood by those skilled in the art. At the operating point, $Q_p(2.49, 0.3218)=I_p(2.49, 0.3218)=2.83\times B$.

Referring to FIGS. 2–4, the modulation depth M of the respective operating point comprises a relationship with a drive voltage of the phase generated carrier. A lower drive voltage promotes a decrease in power consumption of the phase generated carrier, as will be appreciated by those skilled in the art. The modulation depth of the implementation of FIG. 3 is 88% of the modulation depth of the previous design of FIG. 2. The modulation depth of the implementation of FIG. 4 is 79% of the modulation depth of the previous design of FIG. 2.

Figure 5:
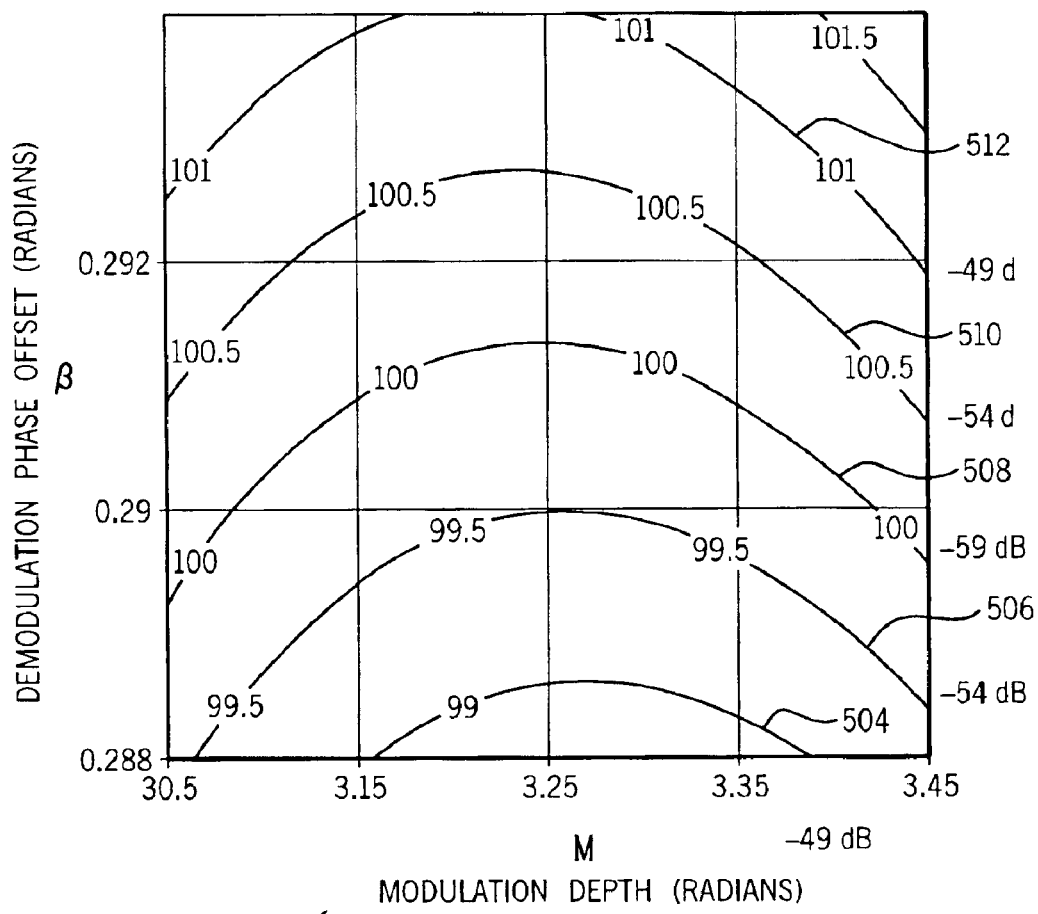
FIG. 5 is a representation of a contour plot of the ratio R(M, $\beta$) and a total harmonic distortion for the previous design of FIG. 2.
Figure 6:
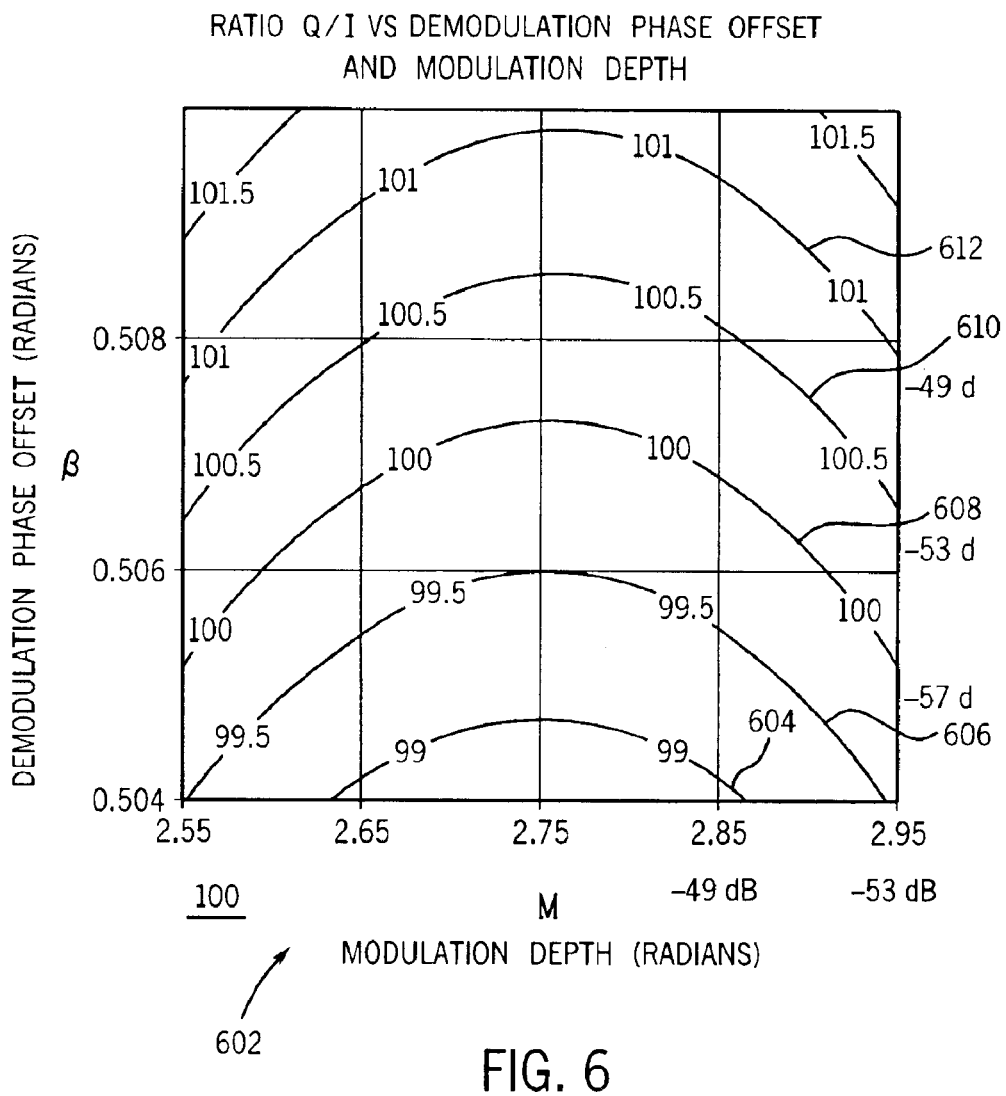
FIG. 6 is another representation of the exemplary contour plot of the ratio R(M, $\beta$) of FIG. 3 and a representation of a total harmonic distortion for the implementation of FIG. 3.
Figure 7:
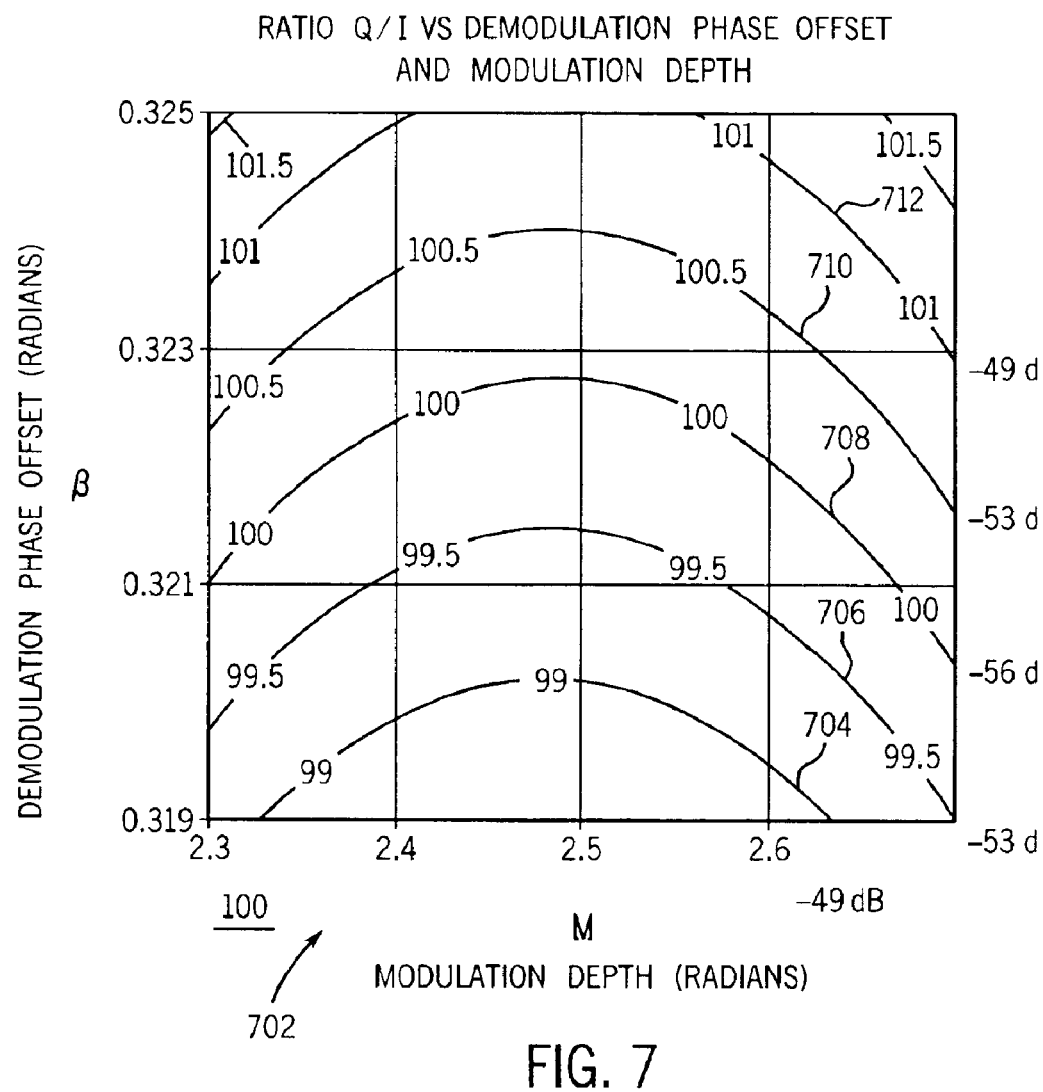
FIG. 7 is another representation of the exemplary contour plot of the ratio R(M, $\beta$) of FIG. 4 and a representation of a total harmonic distortion for the implementation of FIG. 4.

Turning to FIGS. 5–7, contour plots 502, 602, and 702 comprise exemplary representations of the contour plots 202, 302, and 402, respectively, with levels of total harmonic distortion. Contour lines 504, 604, and 704 comprise contour lines where R(M, β) is equal to "99%." Contour lines 506, 606, and 706 comprise contour lines where R(M, β) is equal to "99.5%." Contour lines 508, 608, and 708 comprise contour lines where R(M, β) is equal to "100%." Contour lines 510, 610, and 710 comprise contour lines where R(M, β) is equal to "100.5%." Contour lines 512, 612, and 712 comprise contour lines where R(M, β) is equal to "101%." Total harmonic distortion is evaluated using a Hanning filter on the phase angle ϕ in the calculation of ϕ=arctangent (Q/I). A tone with a peak-to-peak amplitude equal to π is used to evaluate the total harmonic distortion. For example:

$$\varphi(t) = \frac{\pi}{2}\sin(2\cdot\pi\cdot f_{tone}\cdot t + \alpha) + \varphi_{dc}$$

where $f_{tone}$ comprises a frequency of the tone, α comprises a tone offset phase shift, and $\phi_{dc}$ comprises a non-alternating phase angle of the tone. The total harmonic distortion of the $2^{nd}$ through $10^{th}$ harmonics is evaluated at the operating point for the calculation of ϕ of FIGS. 2–4 where the total harmonic distortion is at a minimum.

Referring to FIG. 5, contour plot 502 comprises a representation of the ratio R(M, β) of FIG. 2. The frequency $f_{pgc}$ is equal to 24.576 kHz and $f_{tone}$ is equal to 96 Hz. 4096 samples were taken over a period of 166.67 milliseconds. Values for total harmonic distortion for the contour lines 504, 506, 508, 510, and 512 comprise −49 dB, −54 dB, −59 dB, −54 dB, and −49 dB, respectively.

Referring to FIG. 6, contour plot 602 comprises a representation of the ratio R(M, β) of FIG. 3. The frequency $f_{pgc}$ is equal to 36.864 kHz and $f_{tone}$ is equal to 99 Hz. 4096 samples were taken over a period of 111.11 milliseconds. Values for total harmonic distortion for the contour lines 604, 606, 608, 610, and 612 comprise −49 dB, −53 dB, −57 dB, −53 dB, and −49 dB, respectively.

Referring to FIG. 7, contour plot 702 comprises a representation of the ratio R(M, β) of FIG. 4. The frequency $f_{pgc}$ is equal to 36.864 kHz and $f_{tone}$ is equal to 99 Hz. 4096 samples were taken over a period of 111.11 milliseconds. Values for total harmonic distortion for the contour lines 704, 706, 708, 710, and 712 comprise −49 dB, −53 dB, −56 dB, −53 dB, and −49 dB, respectively.

Referring to FIGS. 5–7, the accuracy of the calculation of the phase angle ϕ further comprises a relationship with a minimum horizontal shift in the modulation depth M and a minimum vertical shift in the demodulation phase offset β between the contour 100 and the contour 100.5. The calculation of FIG. 5 comprises a shift in modulation depth M of 0.095 radians and a shift in demodulation phase offset β of 0.0015 radians. The calculation of FIG. 6 comprises a shift in modulation depth M of 0.16 radians and a shift in demodulation phase offset β of 0.0013 radians. The calculation of FIG. 7 comprises a shift in modulation depth M of 0.16 radians and a shift in the demodulation phase offset β of 0.0013 radians.

The accuracy of the calculation of the phase angle ϕ for the previous design of FIGS. 2 and 5 and the exemplary implementations of FIGS. 3, 4, 6, and 7 comprise a similar accuracy. The processor component 112 in one example employs only four samples as opposed to six samples to promote an increase in speed of calculation of the phase angle ϕ. For example, the processor component 112 calculates the phase angle ϕ 50% faster than the previous design. The increase in sampling rate allows for an increase in frequency $f_{pgc}$ of the phase generated carrier, as will be appreciated by those skilled in the art.

The apparatus 100 in one example employs one or more computer-readable signal-bearing media. An exemplary computer-readable signal-bearing media for the apparatus 100 comprises the recordable data storage media 144 of the processor component 112. For example, the computer-readable signal-bearing media for the apparatus 100 comprises one or more of a magnetic, electrical, optical, biological, and atomic data storage media. In one example, the computer-readable signal-bearing media comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, a sensor array that employs a parameter to induce a time-varying phase angle ϕ on an optical signal that comprises a phase generated carrier, the method comprising the steps of:

calculating a quadrature term Q through employment of one or more of a plurality of samples that are based on the optical signal;

calculating a peak value $Q_p$ of the quadrature term Q;

calculating an in-phase term I through employment of one or more of the plurality of samples that are based on the optical signal;

calculating a peak value $I_n$ of the in-phase term I;

$$I_p(M, \beta) = 2\cdot B\cdot\left(\cos(M\cdot\sin\beta) - \cos\left(M\cdot\sin\left(\frac{\pi}{2} + \beta\right)\right)\right).$$

wherein M is a modulation depth and β is a demodulation phase offset of the phase generated carrier;

calculating an operating point that comprises the modulation depth M and the demodulation phase offset β of the phase generated carrier through employment of the peak value $I_p$ of the in-phase term I and the peak value $Q_p$ of the quadrature term Q; and calculating the phase angle ϕ through employment of the quadrature term Q; and the in-phase term, wherein the quadrature term Q and the in-phase term I are based on the optical signal.

2. The method of claim 1, wherein the step of calculating the phase angle ϕ through employment of the in-phase term I and the quadrature term Q comprises the step of:

calculating the phase angle ϕ through employment of the in-phase term I and the quadrature term Q at the operating point.

3. The method of claim 1, wherein the step of calculating the chase angle φ through employment of the in-phase term I and the quadrature term Q comprises the step of:

calculating the phase angle φ=arctangent(Q/I).

4. The method of claim 1, wherein the phase generated carrier comprises a period $T_{pgc}$, the method further comprising the step of:

sampling an output signal from the sensor array to obtain the plurality of samples from a same instance of the period $T_{pgc}$.

5. The method of claim 4, wherein the plurality of samples comprise samples $S_0$, $S_1$, $S_2$, and $S_3$, wherein the step of calculating the in-phase term I through employment of the one or more of the plurality of samples comprises the step of:

calculating the in-phase term I:

$$I=(S_0+S_2)-(S_1+S_3).$$

6. The method of claim 5, wherein the step of calculating the quadrature term Q through employment of one or more of the plurality of samples that are based on the optical signal comprises the step of:

calculating the quadrature term Q:

$$Q=2*(S_0-S_2);$$

wherein the step of calculating the peak value $Q_p$ of the quadrature term Q comprises the step of:

calculating the peak value $Q_p$ of the quadrature term Q:

$$Q_p(M, \beta)=4 \cdot B \cdot \sin(M \cdot \sin \beta).$$

7. The method of claim 5, wherein the step of calculating the quadrature term Q through employment of one or more of the plurality of samples that are based on the optical signal comprises the step of:

calculating the quadrature term Q:

$$Q=-(S_0-S_2);$$

wherein the step of calculating the peak value $Q_2$ of the quadrature term Q comprises the step of:

calculating the peak value $Q_p$ of the quadrature term Q:

$$Q_p(M, \beta)=2 \cdot B \cdot \sin(M \cdot \beta).$$

8. A method, a sensor array that employs a parameter to induce a time-varying phase angle φ on an optical signal that comprises a phase generated carrier, wherein the phase generated carrier comprises a period $T_{pgc}$, the method comprising the steps of:

calculating the phase angle φ through employment of a quadrature term Q and an in-phase term I, wherein the quadrature term Q and the in-phase term I are based on the optical signal;

wherein the phase generated carrier comprises a period $T_{pgc}$, the method further comprising the step of:

sampling an output signal from the sensor array to obtain the plurality of samples from a same instance of the period $T_{pgc}$;

wherein the step of calculating the phase angle φ through employment of the quadrature term Q and the in-phase term I comprises the steps of:

calculating the in-phase term I through employment of one or more of the plurality of samples;

calculating a quadrature term Q through employment of one or more of the plurality of samples; and calculating the phase angle φ through employment of the in-phase term I and the quadrature term Q;

further comprising the steps of:

calculating a peak value $I_p$ of the in-phase term I;

calculating a peak value $Q_p$ of the quadrature term Q; and calculating an operating point that comprises a modulation depth M and a demodulation phase offset β of the phase generated carrier through employment of the peak value $I_p$ of the in-phase term I and the peak value $Q_p$ of the quadrature term Q;

wherein the plurality of samples comprise samples $S_0$, $S_1$, $S_2$, and $S_3$, wherein the step of calculating the in-phase term I through $Q_p$ employment of the one or more of the plurality of samples comprises the step of:

calculating the in-phase term I:

$$I=(S_0+S_2)-(S_1+S_3);$$

wherein the step of calculating the peak value $I_p$ of the in-phase term I comprises the step of:

calculating the peak value $I_p$ of the in-phase term I:

$$I_p(M, \beta) = 2 \cdot B \cdot \left(\cos(M \cdot \sin\beta) - \cos\left(M \cdot \sin\left(\frac{\pi}{2} + \beta\right)\right)\right).$$

9. The method of claim 8, wherein the step of calculating the quadrature term Q through employment of the one or more of the plurality of samples comprises the step of:

calculating the quadrature term Q:

$$Q=-(S_0-S_2).$$

10. The method of claim 9, wherein the step of calculating the peak value $Q_p$ of the quadrature term Q comprises the step of:

calculating the peak value $Q_p$ of the quadrature term Q:

$$Q_p(M, \beta)=2 \cdot B \cdot \sin(M \cdot \sin \beta).$$

11. The method of claim 10, wherein the step of calculating the phase angle φ through employment of the in-phase term I and the quadrature term Q comprises the step of:

calculating the phase angle φ arctangent(Q/I).

12. The method of claim 8, wherein the step of calculating the quadrature term Q through employment of the one or more of the plurality of samples comprises the step of:

calculating the quadrature term Q:

$$Q=-2*(S_0-S_2).$$

13. The method of claim 12, wherein the step of calculating the peak value $Q_p$ of the quadrature term Q comprises the step of:

calculating the peak value $Q_p$:

$$Q_p(M, \beta)=4 \cdot B \cdot \sin(M \cdot \sin \beta).$$

14. The method of claim 13, wherein the step of calculating the phase angle φ through employment of the in-phase term I and the quadrature term Q comprises the step of:

calculating the phase angle φ=arctangent(Q/I).

15. An apparatus, a sensor array that employs a parameter to induce a time-varying phase angle φ on an optical signal that comprises a phase generated carrier, the apparatus comprising:

a processor component;

wherein the processor component employs one or more of a plurality of samples that are based on the optical signal to calculate an in-phase term I;

wherein the processor component employs one or more of the plurality of samples to calculate a quadrature term Q;

wherein the processor component calculates a peak value $I_p$ of the in-phase term I as $$I_p(M, \beta) = 2 \cdot B \cdot (\cos(M \cdot \sin \beta) - \cos(M \cdot \sin(\pi/2 + \beta)));$$

wherein M is a modulation depth and $\beta$ is a demodulation phase offset of the phase generated carrier;

wherein the processor component calculates a peak value $Q_p$ of the quadrature term Q;

wherein the processor calculates an operating point that comprises the modulation depth M and the demodulation phase offset $\beta$ of the phase generated carrier through employment of the peak value $I_p$ of the in-phase term I and the peak value $Q_p$ of the quadrature term Q;

wherein the processor component employs the quadrature term Q and the in-phase term I to calculate the phase angle $\phi$, wherein the quadrature term Q and the in-phase term I are based on the optical signal.

16. The apparatus of claim 15, wherein the phase generated carrier comprises a period $T_{pgc}$, wherein the processor component obtains the plurality of samples from an output signal from the sensor array within a same instance of the period $T_{pgc}$.

17. The apparatus of claim 16,
wherein the processor component employs the in-phase term I and the quadrature term Q to calculate the phase angle $\phi$ at the operating point.

18. The apparatus of claim 16,
wherein the plurality of samples comprises four samples that are based on the optical signal;
wherein the processor component obtains the four samples from the output signal from the sensor array within the same instance of the period $T_{pgc}$.

19. The apparatus of claim 16, wherein the plurality of samples comprise samples $S_0$, $S_1$, $S_2$, and $S_3$;
wherein the processor component calculates the in-phase term I:

$$I=(S_0+S_2)-(S_1+S_3);$$

wherein the processor component calculates the quadrature term Q:

$$Q=-(S_0-S_2);$$

wherein the processor component calculates the phase angle $\phi$:

$$\phi=\arctangent(Q/I).$$

20. The apparatus of claim 19,
wherein the processor component calculates the peak value $Q_p$:

$$Q_p(M, \beta)=2 \cdot B \cdot \sin(M \cdot \sin \beta)$$

21. The apparatus of claim 20, wherein the processor component employs the peak value $I_p$ and the peak value $Q_p$ to calculate the operating point that comprises a modulation depth approximately equal to 2.75 radians.

22. The apparatus of claim 21, wherein the processor component employs the peak value $I_p$ and the peak value $Q_p$ to calculate the operating point that comprises a demodulation phase offset approximately equal to 0.5073 radians.

23. The apparatus of claim 16, wherein the plurality of samples comprise samples $S_0$, $S_1$, $S_2$, and $S_3$;
wherein the processor component calculates the in-phase term I:

$$I=(S_0+S_2)-(S_1+S_3);$$

wherein the processor component calculates the quadrature term Q:

$$Q=-2 \cdot (S_0-S_2);$$

wherein the processor component calculates the phase angle $\phi$:

$$\phi=\arctangent (Q/I).$$

24. The apparatus of claim 23,
wherein the processor component calculates the peak value $Q_p$:

$$Q_p(M, \beta)=4 \cdot B \cdot \sin(M \cdot \sin \beta).$$

25. The apparatus of claim 24, wherein the processor component employs the peak value $I_p$ and the peak value $Q_p$ to calculate the operating point that comprises a modulation depth approximately equal to 2.49 radians.

26. The apparatus of claim 25 wherein the processor component employs the peak value $I_p$ and the peak value $Q_p$ to calculate the operating point that comprises a demodulation phase offset approximately equal to 0.3218 radians.

27. An article, a sensor array that employs a parameter to induce a time-varying phase angle $\phi$ on an optical signal that comprises a phase generated carrier, the article comprising:

one or more computer-readable signal-bearing media;

means in the one or more media for calculating a quadrature term Q through employment of one or more of the plurality of samples that are based on the optical signal;

means in the one or more media for calculating an in-phase term I through employment of one or more of a plurality of samples that are based on the optical signal;

means in the one or more media for calculating a peak value $I_p$ of the in-phase term I as $$I_p(M, \beta) = 2 \cdot B \cdot \left(\cos(M \cdot \sin \beta) - \cos\left(M \cdot \sin\left(\frac{\pi}{2} + \beta\right)\right)\right),$$

wherein M is a modulation depth and $\beta$ is a demodulation phase offset of the phase generated carrier;

means in the one or more media for calculating peak value $Q_p$ of the quadrature term Q;

means in the one or more media for calculating an operating point that comprises the modulation depth M and the demodulation phase offset $\beta$ of the phase generated carrier through employment of the peak value $I_p$ of the in-phase term I and the peak value $Q_p$ of the quadrature term Q; and means in the one or more media for calculating the phase angle $\phi$ through employment of the quadrature term Q and the in-phase term I, wherein the quadrature term Q and the in-phase term I are based on the optical signal.

28. The article of claim 27, wherein the plurality of samples comprise samples $S_0$, $S_1$, $S_2$, and $S_3$, wherein the means in the one or more media for calculating the quadrature term Q through employment of the one or more of the plurality of samples that are based on the optical signal comprises:

means in the one or more media for calculating the quadrature term Q:

$$Q = -(S_0 - S_2);$$

wherein the means in the one or more media for calculating the peak value $Q_p$ of the quadrature term Q comprises:

means in the one or more media for calculating the peak value $Q_p$ of the quadrature term Q:

$$Q_p(M, \beta) = 2 \cdot B \cdot \sin(M \cdot \sin \beta).$$

29. The article of claim 28, wherein the plurality of samples comprise samples $S_0$, $S_1$, $S_2$, and $S_3$, wherein the means in the one or more media for calculating the quadrature term Q through employment of the one or more of the plurality of samples that are based on the optical signal comprises:

means in the one or more media for calculating the quadrature term Q:

$$Q = -2*(S_0 - S_2);$$

wherein the means in the one or more media for calculating the peak value $Q_p$ of the quadrature term Q comprises:

means in the one or more media for calculating the peak value $Q_p$ of the quadrature term Q:

$$Q_p(M, \beta) = 4 \cdot B \cdot \sin(M \cdot \sin \beta).$$

30. The article of claim 27, wherein the means in the one or more media for calculating the phase angle φ through employment of the in-phase term I and the quadrature term Q comprises:

means in the one or more media for calculating the phase angle φ=arctangent(Q/I) at the operating point.

31. The method of claim 4, wherein the step of sampling the output signal from the sensor array to obtain the plurality of samples from the same instance of the period $T_{pgc}$ comprises the step of:

sampling the output signal from the sensor array to obtain four samples from the same instance of the period $T_{pgc}$.

32. The method of claim 8, wherein the step of sampling the output signal from the sensor array to obtain the plurality of samples from the same instance of the period $T_{pgc}$ comprise the step of:

sampling the output signal from the sensor array to obtain four samples from the same instance of the period $T_{pgc}$.

* * * * *